United States Patent [19]

Chan et al.

[11] Patent Number: 4,823,338

[45] Date of Patent: Apr. 18, 1989

[54] VIRTUAL LOCAL AREA NETWORK

[75] Inventors: Kenneth K. Chan, Eatontown, N.J.; Philip W. Hartmann, Boulder; Scott P. Lamons, Fort Collins, both of Colo.; Terry G. Lyons, Princeton; Argyrios C. Milonas, Middletown, both of N.J.

[73] Assignees: American Telephone and Telegraph Company, New York, N.Y.; AT&T Information Systems Inc., Morristown, N.J.

[21] Appl. No.: 81,081

[22] Filed: Aug. 3, 1987

[51] Int. Cl.[4] .......................... H04J 3/02; H04J 3/24
[52] U.S. Cl. ......................................... 370/85; 370/94
[58] Field of Search ..................... 370/85, 86, 88, 94

[56] References Cited

U.S. PATENT DOCUMENTS 4,707,827 11/1987 Bione et al. ........................ 370/85
4,718,068 1/1988 Oguchi et al. ...................... 370/85

Primary Examiner—Robert L. Griffin
Assistant Examiner—Wellington Chin
Attorney, Agent, or Firm—David H. Tannenbaum; David R. Padnes

[57] ABSTRACT

A system is disclosed for completing communication connections from end-users served by a connectionless (broadcast) type system in a manner which allows expansion of the calling area beyond the immediate physical limitations of the broadcast media. The system is based upon a device for mediating between the connectionless system and a connection oriented system. The device creates logical local area networks interconnectable by the connection oriented system. Calling user identification is used in conjunction with call completion data stored in a central memory for controlling all interconnections.

10 Claims, 5 Drawing Sheets

CALL SET UP SEQUENCE

UMBILICAL CONNECTIONS
AND VIRTUAL LANS

STAND-ALONE LANS

PRIOR ART

FIG. 6
VLAN SERVER DATABASE

| VLAN | END-SYSTEMS |
|------|-------------|
| A | 410, 412 |
| B | 411, 412, 413, 409 |
| ⋮ | ⋮ |

FIG. 7
VLAN SERVER NAME TABLE

| NAME | TELEPHONE NUMBER |
|------|------------------|
| PAYABLE | 1212 |
| PAYROLL | 1313 |
| PERSONEL | 1414 |
| RECEIVABLE | 1212 |
| ⋮ | ⋮ |

VIRTUAL LOCAL AREA NETWORK

BACKGROUND OF THE INVENTION

This invention relates to local area networks and, more particularly, to an arrangement whereby a broadcast oriented system can be used in conjunction with a connection oriented system.

In communication systems there are basically two types of systems, namely, connectionless and connection oriented. Connectionless systems are broadcast oriented such that every end-system monitors all transmissions and responds when it "hears" its own address. In a connection oriented system a calling end-system calls (using some code) a called end-system and the network acts to establish a communication linkage between the calling and called system. The typical telecommunication system (when the end-systems are telephones) operates in the connection oriented mode.

One use of connectionless (broadcast) systems is for establishing Local Area Networks (LANs) where a number of end-systems, such as host computers and personal computers (PCs), can become "connected" for the interchange of data. However, since connectionless LANs are inherently limited in size, confined to a local area, and difficult to move or re-configure due to the nature of the broadcast media, it is often desired to take the features of a connectionless LAN and emulate then with a connection oriented network. However, the services and features provided by a typical connectionless LAN, e.g., datagram services and name services, rely on the broadcast nature of the network where every end-system monitors all transmissions. Thus, these services do not inherently work in a connection oriented network because in such networks communications are only directed to particular end-systems and are not broadcasted to all end-systems.

A problem in a connectionless LAN is that, while any end-system on the LAN can communicate with any other end-system on the LAN, they do so with no security control. Thus, it is a desirable feature to add security to a connectionless network such that calls between end-systems are authorized before completion.

A further problem with connectionless LANs is their limited bandwidth since in such systems every transmission is monitored, thereby requiring every end-system active on the LAN to process large amounts of otherwise useless data in order to determine which transmissions are destined for it.

One solution to these problems has been to provide a centralized process within connection oriented system that acts as a server to each end-system. Each end-system is then connected to the server via a special connection, referred to as an umbilical connection, over which the end-system and the server communicate with one another. The server relies upon both administered information (information stored in the server) and information that is dynamically on a connection-by-connection basis obtained from each end-system in order to accept data transmission from the end-systems over the umbilical connections. When appropriate, the server directs data transmissions to specified destination end-systems over the umbilical connections. Based on dialogues carried out over these umbilical connections, the server also mediates the establishment of direct connections between end-systems. Thus, it is the server that controls the communication between all end-systems.

This, however, only solves part of the problem. There remains the problem that the server does not know the identity of the end-systems.

SUMMARY OF THE INVENTION

Our invention takes advantage of the calling party ID features and the wide area networking (WAN) capabilities of the Integrated System Digital Network (ISDN). Using our system, the server associates the calling party ID of an end-system with the umbilical connection that the end-system sets up with the server. Thus, the server is able to keep track of each end-system's "identity" and can associate a message sent over an umbilical connection with the end-system that sent the message. Using this mechanism, the server can provide centralized support for name services, datagram services, and can also mediate virtual circuit connections between end-systems. The WAN capabilities of ISDN are accordingly used to "stretch" these LAN features to other physical locations.

With these capabilities, the limitations of a connectionless LAN are overcome by the connection oriented LAN. First, the size of a connection oriented LAN is not restricted in the same way that a connectionless LAN is limited, i.e., by the properties of the broadcast media. Second, the connection oriented LAN is not limited to a local area by virtue of the fact that different physical locations can be interconnected in the traditional manner via a public or private telephone switch.

In our system, a virtual LAN is created in memory in the server process. The names of one or more virtual LANs are defined in the server process along with the "identity" (i.e., Calling Party ID) of each end-system in each virtual LAN. Thus, the set of end-systems is logically partitioned into many virtual LANs by simply providing the appropriate software definitions to the centralized server process. End-systems can be added to, or deleted from, virtual LANs by simply changing the definitions within the server process. No physical movement of the end-systems is necessary. Thus, an end-system participates in a single virtual LAN by specifying the name of that virtual LAN when it attempts to establish an umbilical connection to the server. An end-system cannot set up an umbilical connection to the server if 1) it has not been "authorized" to do so by having its "identity" defined to the server, and/or 2) it has not been "authorized" to do so by having been defined to the server as one of the end-systems that can participate in the virtual LAN whose name it specified when attempting to set up the umbilical connection.

The centralized server mediates the establishment of all calls between end-systems in the set of virtual LANs and, in the process of doing so, provides a security function. Recall that the server knows the "identity" of an end-system (as associated with that end-system's umbilical connection). Therefore, when an end-system indicates that it wishes to establish a connection to another end-system, the server can carry out a detailed verification scheme in order to determine whether the call should and can be carried out. If so, the server then performs a function that "authorizes" the call be generating a unique security code which is then supplied to the calling end-system and to the called end-system. As part of the establishment of the call between the two end-systems, the end-systems exchange the security code and compare them for correctness. Thus, a call from one end-system to another that has not been "authorized" by the server will not succeed. End-systems are thus prevented from making "unauthorized" calls to other end-systems.

The centralized server reduces bandwidth problems by virtue of the fact that it handles the call establishments of all end-systems by directing the call establishment to the proper end-system. Thus, an end-system has only to keep track of its own name or names and is not responsible for having to receive and handle numerous transmissions destined for other end-systems.

An end-system that wishes to send a datagram message to a multiple of end-systems sends one copy of that message to the server. The server then distributes the message only to the end-systems that were specified as the destinations. Contrast this to a connectionless network in which the message must be received by all end-systems regardless of which of those end-systems are the true "destinations" of the message.

In addition, the server, in performing the call mediation services, also: determines that the calling end-system is not an intruder, determines whether the called end-system is active (i.e., has an umbilical connection), determines whether the called end-system is authorized to accept a call from the calling end-system, and determines whether the two end-systems have compatible software or protocols. Thus, the server can prevent needless call attempts between incompatible end-systems. By performing all of these services, the server effectively reduces the processing workload of the end-systems, thereby increasing bandwidth capability of the entire network.

BRIEF DESCRIPTION OF THE DRAWINGS

These and other objects and features, together with the operation and utilization of the present invention, will be more apparent from the illustrative embodiment shown in conjunction with the drawings in which FIG. 6 shows a typical server database organization, and FIG. 7 shows a typical VLAN server name table.

DETAILED DESCRIPTION

Figure 1:
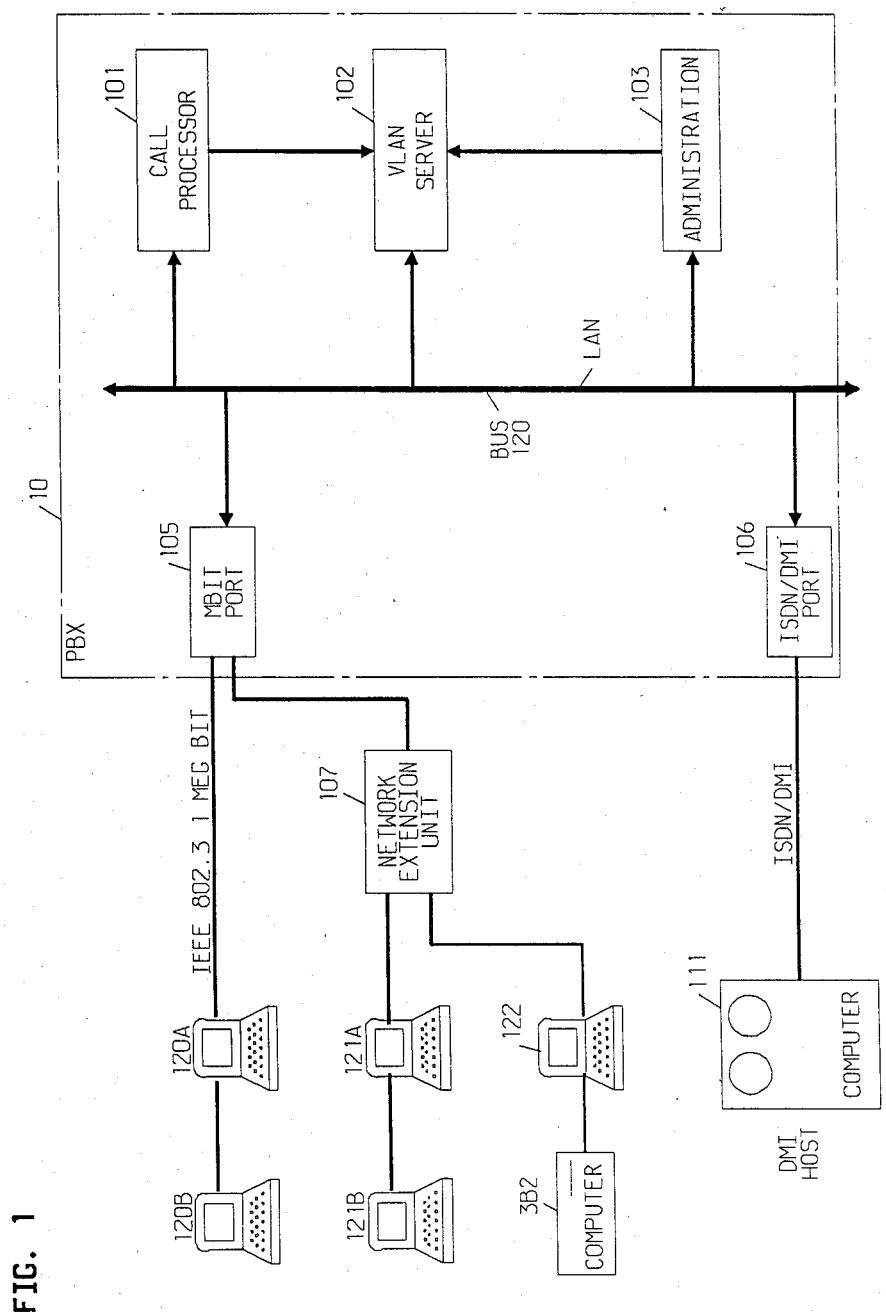
FIG. 1 shows a virtual Local Area Network using our central server.

Turning now to FIG. 1, there is shown a switching control system, such as PBX 10, with a number of end-systems, such as PCs 120A, 120B, 121A, 121B, and 122, and computers, such as 3B2 and 111, connected via ports, such as ports 105-106 to bus 120, such as a packet bus, located within PBX 10. Also connected to bus 120 is call processor 101, virtual local area network (VLAN) server 102 and administration unit 103.

Illustrating the type of PCs and computers that could be connected to bus 120, we have shown PCs 120A, 120B, 121A, 121B, and 122, and computers 3B2 and 111. PCs 120A and 120B are daisy chained together, in well-known fashion as are computers 121A and 121B, 122 and 3B2. Also shown is a network extension unit 107 which connects multiple daisy chains together. The operation of this unit is also well-known.

PCs 120A, 120B, 121A, 121B, 122, computer 3B2 and the network extension unit 107 are connected to the mbit port 105 on system 10 via the IEEE 802.3 1 megabit medium, the specifications for which are contained in the IEEE 802.3 1 Base 5 Specifications. End-systems 120A, 120B, 121A, 121B, 122 and 3B2 can by any type of equipment. However, the embodiment shown utilizes the processing capabilities of these end-systems, thus ideally, these end-systems could be PCs, such as AT&T PC 6300s, AT&T UNIX PCs and AT&T 3B2 computers.

Host computers, such as computer 111, are connected to the ISDN/DMI port 106 via the DMI medium. The specifications for the DMI interface are contained in the "Digital Multiplexed Interface" specification available from AT&T, which publication is hereby incorporated by reference herein.

End-systems such as AT&T PC 6300 require an interface card such as the AT&T STARLAN network access unit, and the software driver that these end-systems would use to provide VLAN functionality is DMI Mode 3, with a NETBIOS interface and ISDN signaling for call control. The specifications for NETBIOS are contained in the IBM PC Network Technical Reference, which publication is also hereby incorporated by reference herein. The ISDN signaling message set is detailed in "ISDN Primary Rate Interface Specification," published by AT&T, dated March 1985, which publication is hereby incorporated by reference herein.

End-systems such as the AT&T UNIX PC and computers such as AT&T 3B2 also require an interface card such as the AT&T STARLAN network access unit. In addition, the drivers in these units would use DMI Mode 3, ISDN signaling and the UNIX Transport Level Interface (UTLI) to provide VLAN functionality. The specifications for UTLI are contained in "AT&T UNIX System V Network Programmers' Guide," Issue 1, copyright 1986 (DOC 307230), available from AT&T, which document is hereby incorporated by reference herein.

Computers, such as DMI hose 111, require a DMI interface and drivers that use DMI Mode 3 and ISDN signaling to provide VLAN functionality. A NETBIOS or a UTLI interface can be used, depending on the computer.

For control purposes VLAN server 102 is a software process that resides in system 10. A call processor 101 and administration processor 103 are also required. VLAN server 102 can run on either call processor 101 or administration processor 103.

In order for the participating end-system to be part of a VLAN, an umbilical connection has to be set up between the end-system and the VLAN server.

The umbilical connection allows the end-system to obtain calling information from the VLAN server. The end-systems call each other by names. The system manages calls by telephone numbers. Thus, when an end-system wants to call another by name, it asks the VLAN server over the umbilical connection for the telephone number of the destination.

Similarly, end-systems can add and delete names for themselves. The VLAN server keeps track of these names and associates them with the correct telephone numbers. FIG. 7 illustrates the name to telephone number association.

Finally, since datagram services requires no call set up, the VLAN server has to handle datagrams by sending them along umbilical connections. The calling end-system sends a datagram to the VLAN server via its umbilical connection, and the VLAN server puts it on the destination umbilical connection.

VLAN Partitioning

Figure 4:
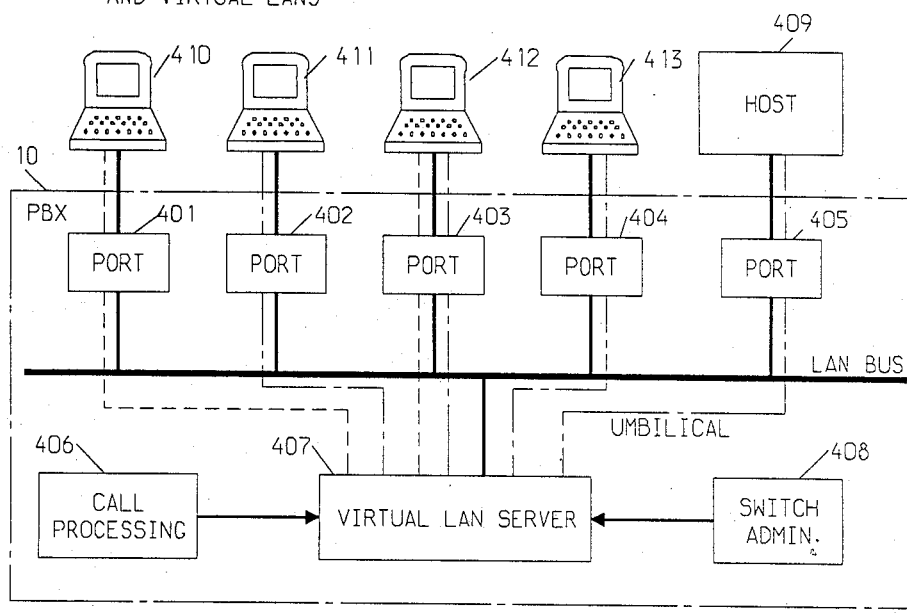
FIG. 4 illustrates the umbilical connections to the central virtual LAN server.

The VLAN server, therefore, has complete control of which end-systems are allowed to be on the VLAN. Further, through administration, the VLAN server can partition end-systems into separate virtual LANs. An end-system can belong to more than one logical LAN. FIG. 4 illustrates how this is accomplished.

In FIG. 4, PCs 410 and 412 have been defined to be members of virtual LAN A (shown with a uniformly dashed line). PCs 411, 412 and 413 and computer 409 have been defined to be members of virtual LAN B (shown with a long and short dashed line). These definitions were provided to server 407 through switch administration 408. The definitions are maintained by server 407 in its database as shown in FIG. 6.

Note that end-system 412 is defined to be a member of both virtual LAN A and virtual LAN B. End-system 412 may thus participate in connections via both LANs, but can only participate in connections one at a time.

The end-system specifies in which of the virtual LANs that it wishes to participate at the time it establishes an umbilical connection. Thus, an umbilical connection is directly associated with a particular virtual LAN defined within server 407. In the illustration shown, end-system 412 could be participating in virtual LAN A. At any given time, end-system 412 may tear down its umbilical connection for virtual LAN A, thus terminating its participation in that virtual LAN, and it may then set up an umbilical connection for virtual LAN B in order to participate in that virtual LAN.

An end-system which has not set up an umbilical connection will not be able to participate in a LAN. In this state, it cannot request any broadcast services, such as name services or datagram services, from VLAN server 407. Additionally, server 407 will not forward any data to it from other end-systems and will prevent other end-systems from attempting to call it. End-systems can send special instructions, such as "not active" to the server. Communications will not be sent to an end-system while such an instruction is present in the server.

Any end-system may be added to one or more virtual LANs which are known to server 407 or may be deleted from a virtual LAN. For example, end-system 411 may be deleted from virtual LAN B and added to virtual LAN A simply by instructing switch administration 408 to update the database of server 407.

Figure 5:
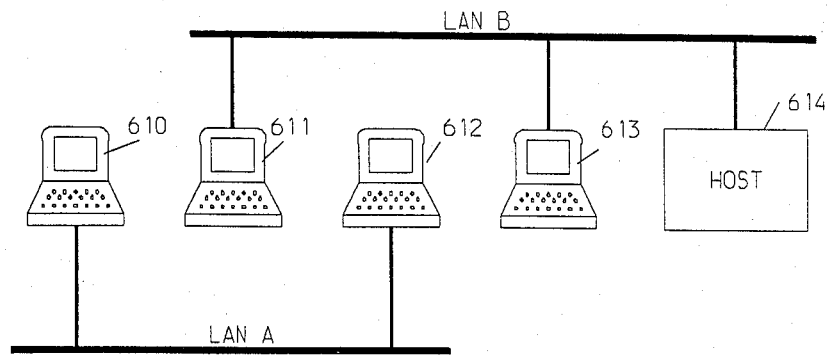
FIG. 5 shows a typical prior art Local Area Network.

FIG. 5 serves to illustrate the difference between virtual LANs and prior art stand-alone LANs. In this figure, end-systems 610 and 612 are members of LAN A. End-systems 611, 613 and 614 are members of LAN B. This membership is implicit in the fact that the end-systems are physically attached to those LANs. Whether or not the end-systems are participating in their respective LANs depends soley upon whether they are powered-up and running the appropriate network interface software. Thus, each end-system is a member of one LAN because each end-system is attached to only one LAN. In order to move an end-system from one LAN to the other, the physical connection must be changed, implying that the end-system probably must be moved.

VLAN Security

Figure 3:
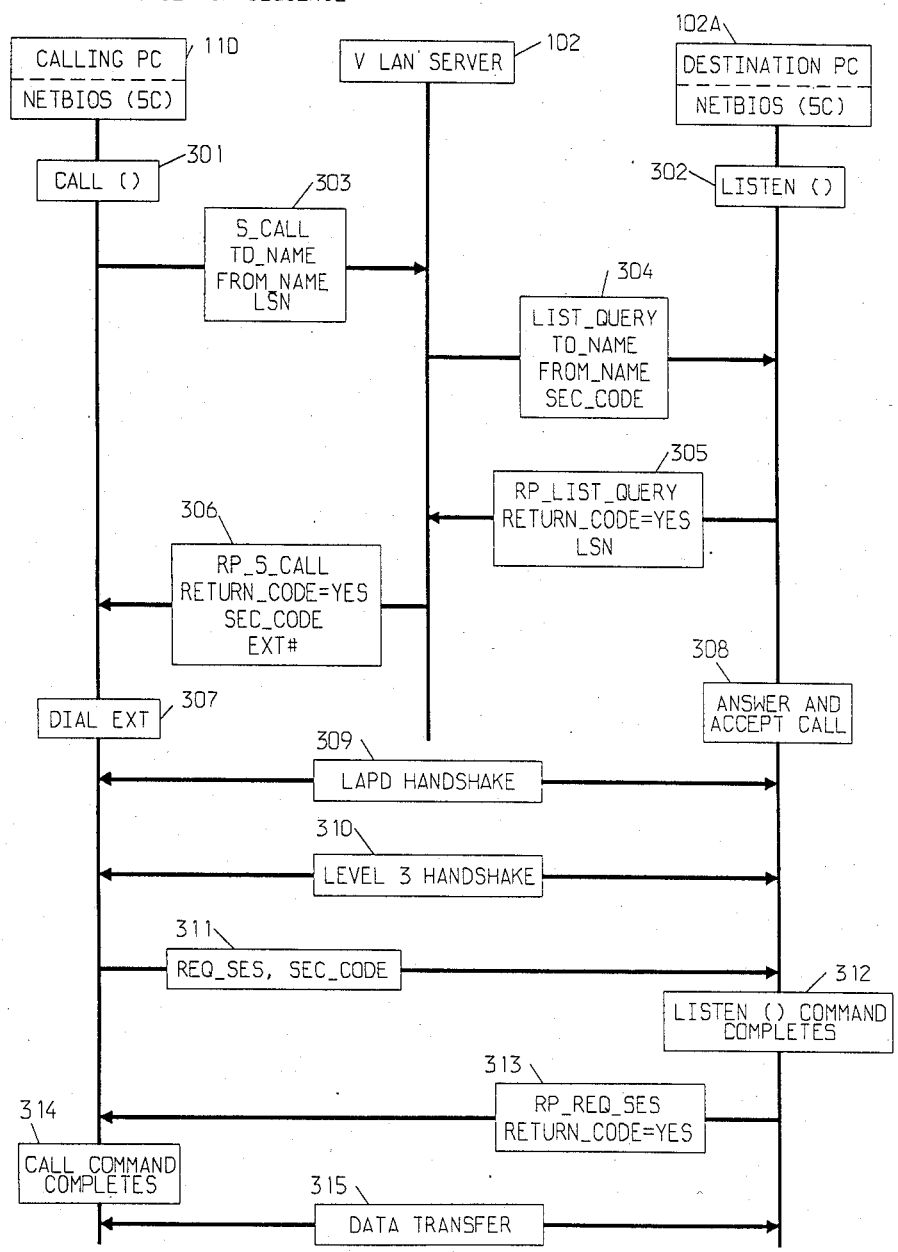
FIG. 3 shows a flow chart of the call set up process.

In order to prevent end-systems from dialing each other without the knowledge of the VLAN server, the following security code scheme is used, as discussed with respect to FIG. 3 of the Call Set Up Sequence:

During name service call set up, the VLAN server sends a randomly generated unique security code SEC_CODE to the destination, which is saved by the destination driver.

The VLAN server then sends the SEC_CODE to the calling end-system, whose driver then sends the SEC_CODE to the destination driver, who checks to see if it matches with the one it received from the VLAN server earlier. If it matches, the call is allowed.

VLAN Brokerage

In addition, since the VLAN server knows the status of all end-systems, it can police call set ups by cutting down unnecessary attempts when the destination has not posted a LISTEN, i.e., the destination is not active. This is illustrated in process 302 in FIG. 3: Call Set Up Sequence.

Umbilical Connection Establishment

Figure 2:
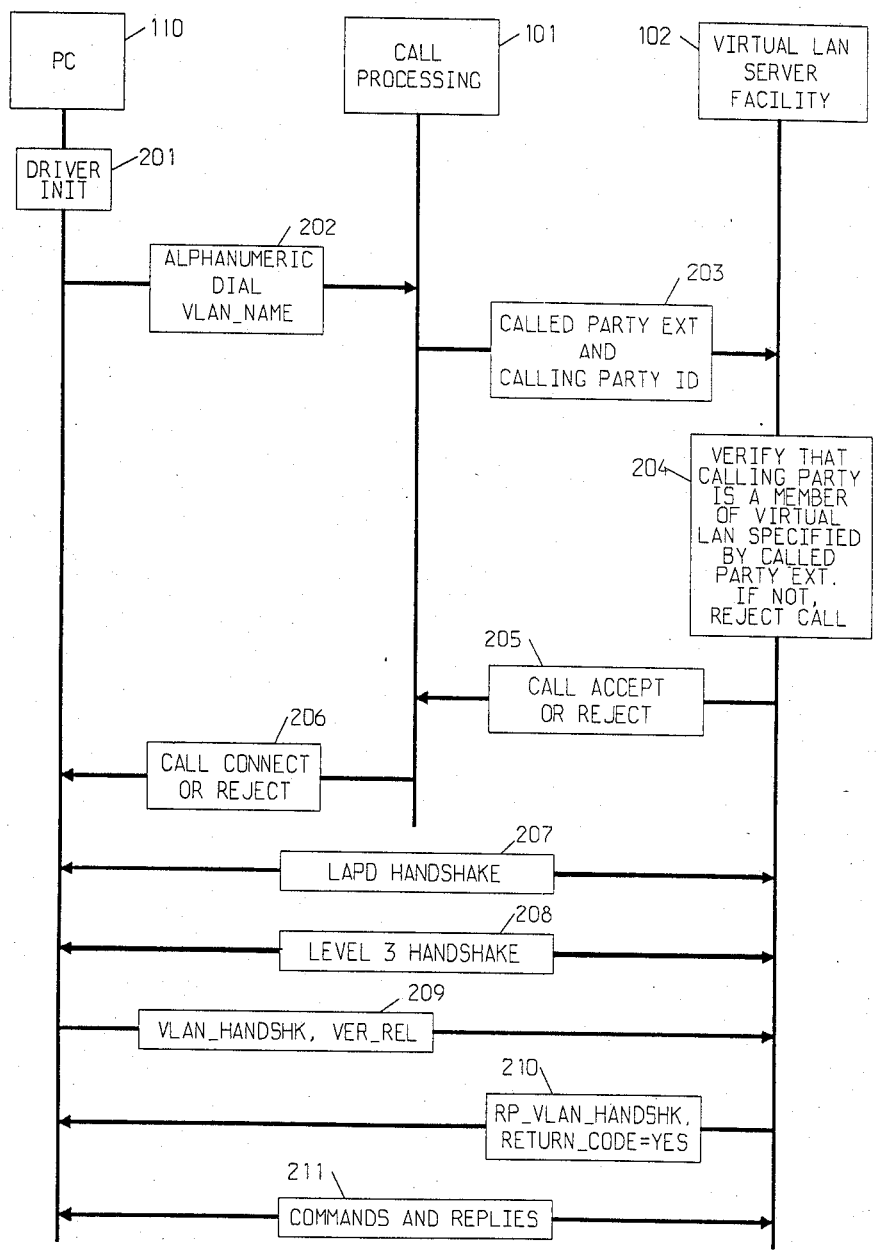
FIG. 2 shows a flow chart of the umbilical connection establishment process.

FIG. 2 illustrates the sequence of high-level steps performed to establish an umbilical connection between an end-system and VLAN server 102 (FIG. 1).

The virtual LAN Mode 3 NETBIOS driver in the end-system (such as PC 110, FIG. 2) starts up and does some initialization, e.g., establishes the signaling link between itself and PBX Call Processing over which virtual circuit connection establishment is carried out, as shown in process 201. The end-system places a call to VLAN server 102 using alphanumeric dialing, as shown in process 202. The alphanumberic dial string that is supplied is a symbolic name for the virtual LAN in which the end-system wishes to participate.

Call Processing 101 (FIG. 2) translates the alphanumeric dial string into the associated extension number for that virtual LAN (as defined through the switch administration software contained in unit 103, FIG. 1). It recognizes the extension number as one to which server 102 will respond. Call processing 101 then sends a message to server 102 to inform it that a call destined for it has been requested. Within the message, as shown in process 203, call processing supplies the extension number of the calling end-systems as the Calling Party ID and the translated extension number as the Called Party ID in order to identify the origin and destination of the requested call.

Server 102 facility checks process 204 to see if the calling end-system identified by the Calling Party ID is a valid member of the virtual LAN specified by the Called Party ID, again, as defined through the switch adminstration software. If so, server 102 responds, process 205, to call processing 101 that it will accept the call. Otherwise, the server responds that the call is to be rejected.

In this example, the calling end-system has been defined to be a member of the virtual LAN in which it is attempting to participate. Server 102 sends a call acceptance message, process 205, to call processing, which in turn sends a call connect message, process 206, to the end-system which indicates that the call has been accepted and that a physical connection has been set up.

Software layers in the end-system driver and in the PBS's communications support, processes 207, 208, 209 and 210, carry out dialogues with one another on a layer-to-layer basis, called "handshaking," to verify that like-layers are compatible and to establish communication between the like-layers. First, a handshake is performed between the data link layer (level 2) software, process 207, in the end-system and in the PBX. Then, a handshake, process 208, is performed between the network layer (level 3) software in the end-system and in the PBX. At this point, the virtual circuit connection that is to become the umbilical connection is established.

Prior to carrying out virtual LAN message exchanges over the virtual circuit connection, a handshake, process 209, must be performed between server 102 and the layer of the end-system driver that handles virtual LAN messages in order to verify their compatibility. The end-system is responsible for sending a handshake message to the server which conveys the software version and release numbers of the end-system driver.

Server 102 compares the end-system's driver version and release numbers with its own version and release numbers. In this example, the numbers are compatible and so the server sends the end-system a reply message, process 210, in response to the handshake message indicating that the handshake is successful. At this point, the umbilical connection has been successfully established.

Next, as shown in process 211, the end-system and the server may exchange virtual LAN messages with one another to carry out name services, datagram services, and call mediation services, etc.

Name Service and Call Set Up

Once the umbilical connection is set up, an end-system can make calls to other end-systems on the same LAN, with the help of VLAN server 102 without going through the rigorous umbilical connection set up procedure.

FIG. 3 illustrates the sequence of high-level steps performed to set up a virtual circuit connection and establish a session between two end-systems participating in the same virtual LAN.

The virtual LAN Mode 3 NETBIOS driver in end-system 110, as indicated by its name, provides a NETBIOS interface to which application programs can issue network-related commands. In order to initiate a call to another end-system, an application in the origin end-system issues a CALL command, process 301, to the NETBIOS interface of the driver. Two of the parameters specified in the CALL command are the name of the origin (FROM_NAME) placing the call and the name of the destination (TO_NAME) to which the call is directed.

In order to indicate to the driver that it wishes to receive a call from another end-system, an application on destination end-system 120A issues a LISTEN command, process 302, to the NETBIOS interface of the driver. Two of the parameters specified in the LISTEN command are the name of the origin (FROM_NAME) from which the call will be accepted and the name of the destination (TO_NAME) that wishes to receive the call.

The driver in the originating end-system accepts the CALL command and sends an S_CALL, process 303, message to server 102. The S_CALL message carries TO_NAME and FROM_NAME as specified in the CALL command.

Upon receipt of the S_CALL message, server 102 performs some verification steps (e.g., is the origin name really a member of the virtual LAN associated with the umbilical connection over which the message was received?; is TO_NAME known in this virtual LAN?; are the version and release numbers of the drivers at the two end-systems compatible?; etc.) If server 102 verifies that the call request can and should be attempted, it sends a LIST_QUERY message, process 304, to destination 120A. The purpose of the LIST_QUERY is to determine if that end-system has issued a LISTEN specifying TO_NAME as the destination name and FROM_NAME as the origin name.

An important piece of information that the server 102 includes in the LIST_QUERY is a unique security code (SEC_CODE) that is associated specifically with this particular call request. The driver in destination end-system 120A receives the LIST_QUERY and checks to see if there is an outstanding LISTEN command that specifies TO_NAME as the destination name and FROM_NAME as the origin name. In this example, it finds the outstanding LISTEN. The driver saves the SEC_CODE from the LIST_QUERY in anticipation of receiving the call. The driver then sends, process 305, a reply to the LIST_QUERY (RP_LIST_QUERY) that contains a return code indicating that an outstanding LISTEN was found and, therefore, that the call request is acceptable.

Server 102 receives the positive RP_LIST_QUERY and sends a reply, process 306, to the S_CALL (RP_S_CALL) to calling end-system 110. The RP_S_CALL. contains a return code indicating that the requested call can be attempted.

Server 102 includes two important pieces of informatiton in the RP_S_CALL. One is the extension number of destination end-system 120A that calling end-system 110 must dial in order to set up the call. The second is the unique security code (SEC_CODE) that was generated and included in the LIST_QUERY sent to the destination end-system.

The driver in calling end-system 110 receives the positive RP_S_CALL and dials, process 307, the indicated extension number in order to set up the physical connection to destination end-system 120A.

Destination end-system 120A answers and accepts the call via process 308, and the data link layers as discussed with respect to FIG. 2 of the two end-system drivers handshake, process 309. This is followed by handshaking between the network layers of the two end-system drivers, process 310. At this point, the virtual circuit connection has been successfully established and calling end-system 110 driver then sends a message, process 311, to request a session (REQ_SES) to the destination end-system over the virtual circuit connection. The REQ_SES contains the SEC_CODE generated for this call be server 102.

Destination end-system 120A driver receives the REQ_SES message and compares the SEC_CODE contained within it with the SEC_CODE saved from the LIST_QUERY for this call. In this example, the two codes match and so the destination end-system accepts the session request. At this time, the destination end-system driver notifies, process 312, the application that issued the LISTEN that the LISTEN has completed successfully by sending a reply, process 313, to the REQ_SES (RP_REQ_SES) to the calling end-system. The RP_REQ_SES contains a return code that indicates that the session is accepted by the destination end-system.

The origin end-system driver receives the positive RP_EQ_ES and notifies the application, process 314, that issued the CALL that the CALL has completed successfully. The applications on the two end-systems can now exchange data by issuing the appropriate data transfer and receive commands, process 315, to the NETBIOS interface of their respective drivers.

What is claimed is:

1. A device for controlling communications between a plurality of end-systems, said device comprising
    means for establishing one or more groups of end-systems, each of said established groups identifying each end-system authorized to be a member thereof,
    means for receiving first information from a calling one of said end-systems, said first information including an identification of this end-system and a request for membership in one of said established groups,
    means responsive to said first information and to said one or more established groups for granting said request if and only if said calling end-system is an authorized member of the group requested, and
    means responsive to second information from said calling end-system and to the granting of said request for controlling communications between this calling end-system and called one of said end-systems identified in said second information.

2. The device of claim 1 wherein said controlling means couples communications between said calling and called end-systems if and only if these end-systems are within the same established group of end-systems.

3. The device of claim 1 wherein said establishing means establishes a plurality of groups of end-systems and said communications controlling means prevents communications between said calling and called end-systems when these end-systems are within different groups.

4. The device of claim 1 wherein said device further comprises means for determining whether there is communication compatibility between said calling and called end-systems and for preventing communications between calling and called end-systems if a communication incompatibility exists.

5. The device of claim 4 wherein said communication incompatibility results from unlike communication establishment protocols.

6. The device of claim 1 wherein said second information includes an identification of other called ones of said end-systems and said controlling means controls communication between said calling end-system and said other called end-systems.

7. The device of claim 1 wherein said establishing means includes means for specifying at least one group as an authorized group for each of said end-systems.

8. The device of claim 1 wherein said controlling means includes means for sending special instructions pertaining to communications between said calling and calling end-systems, said special instructions pertaining to communication completion.

9. The device of claim 8 wherein the special instructions sent to said calling and called end-systems are identical.

10. The device of claim 1 further including
    a communication switch operating in a connection oriented mode,
    means for connecting said connection oriented switch to said end-systems which operate in a connectionless mode, and
    means for connecting said switch to said device.

* * * * *

UNITED STATES PATENT AND TRADEMARK OFFICE
CERTIFICATE OF CORRECTION

PATENT NO. : 4,823,338

DATED : April 18, 1989

INVENTOR(S) : Kenneth K. Chan, Philip W. Hartmann, Scott P. Lamons, Terry G. Lyons, Argyrios C. Milonas It is certified that error appears in the above-identified patent and that said Letters Patent is hereby corrected as shown below:

Column 1, line 17, "system" should read --systems--; line 28, "then" should read --them--; line 52, "connection" should read --the connection--; line 61, "transmission" should read --transmissions--.

Column 2, line 61, "be" should read --by--; line 67, "been" should read --first been--.

Column 4, line 40, "hose" should read --host--.

Column 5, line 43, "active" should read --active,--; line 61, "soley" should read --solely--.

Column 6, line 36, "alphanumberic" should read --alphanumeric--; line 48, "end-systems" should read --end-system--; line 68, "PBS's" should read --PBX's--.

Column 8, line 7, "etc.)" should read --etc.).--; lines 35 and 36, "informatiton" should read --information--.

UNITED STATES PATENT AND TRADEMARK OFFICE
CERTIFICATE OF CORRECTION

PATENT NO. : 4,823,338
DATED : April 18, 1989
INVENTOR(S) : Kenneth K. Chan, Philip W. Hartmann, Scott P. Lamons, Terry G. Lyons, Argyrios C. Milonas It is certified that error appears in the above-indentified patent and that said Letters Patent is hereby corrected as shown below:

Column 9, line 4, "_ES" should read --_SES--; line 29, "called" should read --a called--.

Column 10, line 25, "calling" should read --called--.

Signed and Sealed this

Third Day of August, 1993

Attest:

MICHAEL K. KIRK

*Attesting Officer*   *Acting Commissioner of Patents and Trademarks*

REEXAMINATION CERTIFICATE (3666th)
United States Patent [19]
Chan et al.

[11] B1 4,823,338
[45] Certificate Issued Nov. 10, 1998

[54] VIRTUAL LOCAL AREA NETWORK

[75] Inventors: Kenneth K. Chan, Eatontown, N.J.; Philip W. Hartmann, Boulder; Scott P. Lamons, Fort Collins, both of Colo.; Terry G. Lyons, Princeton; Argyrios C. Milonas, Middletown, both of N.J.

[73] Assignees: AT&T Information Systems Inc., Morristown, N.J.; American Telephone and Telegraph Company, New York, N.Y.

Reexamination Request:
No. 90/004,281, Jun. 18, 1996

Reexamination Certificate for:
Patent No.: 4,823,338
Issued: Apr. 18, 1989
Appl. No.: 81,081
Filed: Aug. 3, 1987

Certificate of Correction issued Aug. 3, 1993.

[51] Int. Cl.$^6$ .................................. H04J 3/02; H04J 3/24
[52] U.S. Cl. ........................................ 370/522; 370/908
[58] Field of Search ................................ 370/522, 908, 370/405

[56] References Cited

U.S. PATENT DOCUMENTS

| | | | |
|---|---|---|---|
| 4,348,554 | 9/1982 | Asmuth | 379/113 |
| 4,439,636 | 3/1984 | Newkirk et al. | 379/123 |
| 4,574,346 | 3/1986 | Hartung | 395/444 |

FOREIGN PATENT DOCUMENTS

| | | | |
|---|---|---|---|
| 0161031 | 11/1985 | European Pat. Off. | H04Q 3/495 |
| 0228634 | 7/1987 | European Pat. Off. | G06F 15/40 |
| 0253421 | 1/1988 | European Pat. Off. | H04M 7/00 |
| 0260043 | 3/1988 | European Pat. Off. | H04M 3/42 |
| 61-253952 | 11/1986 | Japan | H04L 11/20 |
| 63-193630 | 8/1988 | Japan | H04L 11/00 |
| 63-222538 | 9/1988 | Japan | H04L 11/00 |

OTHER PUBLICATIONS

*Data Communication Networks Interworking Between Networks*, Recommendation X.300, ITU/CCITT Red Book, vol. VIII, Fascicle VIII.6, (1985), pp. 37–47.

*Data Communication Networks Interfaces*, Recommendation X.25, ITU/CCITT Red Book, vol. VIII, Fascicle VIII.3, (1985), pp. 158–159, 197–202, 239.

*Data Communication Networks Terminal Equipment and Interfaces*, Recommendations X.2 and X.25 ITU/CCITT Yellow Book, vol. VIII, Fascicle VIII.2, (1981), pp. 7–10 and 162–166.

B. Lindgren, *The X.25 Handbook*, Infotrans AB, (Sweden, 1987), pp. 6–5 and 6–7.

*X.25: The PSN Connection*, Hewlett–Packard, (France, Oct. 1985), pp. 6–2 and 6–7.

B. W. Marsden,*Communication Network Protocols*, (2nd Edition), Chartwell Bratt Ltd., (Sweden, 1986), p. 109.

R. J. Deasington, *X.25 Explained: Protocols for Packet Switching Networks*, Ellis Horwood Limited, (Great Britain, 1985), p. 60.

M. Berger et al., *AT&T Software Defined Network Service A New Customer Controlled Network Service*, Globecom'85, New Orleans, Louisiana, IEEE #85CH2190–7 85–80023, vol. 2 of 3, Dec. 2–5, 1985, pp. 763–767.

*Primary Examiner*—Wellington Chin

[57] ABSTRACT

A system is disclosed for completing communication connections from end-users served by a connectionless (broadcast) type system in a manner which allows expansion of the calling area beyond the immediate physical limitations of the broadcast media. The system is based upon a device for mediating between the connectionless system and a connection oriented system. The device creates logical local area networks interconnectable by the connection oriented system. Calling user identification is used in conjunction with call completion data stored in a central memory for controlling all interconnections.

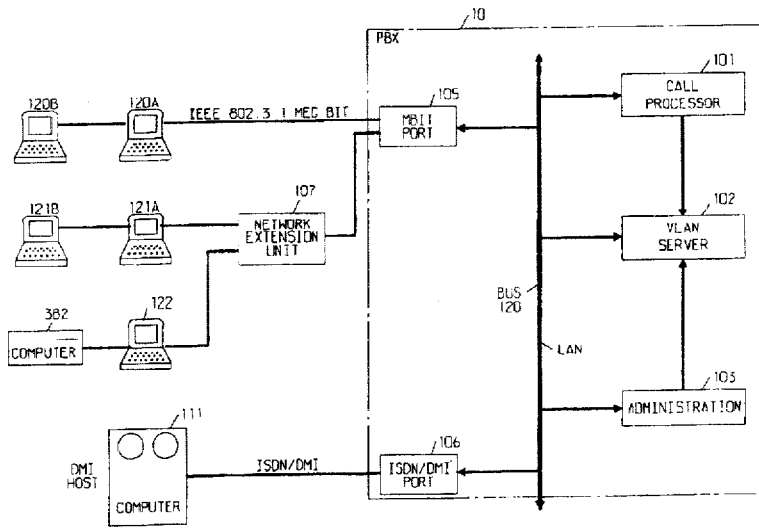

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–10 is confirmed.

\* \* \* \* \*